Nov. 3, 1964  S. PETERSON  3,155,224
TRAY MEANS FOR EGG CONVEYORS
Filed Sept. 17, 1963  2 Sheets-Sheet 1
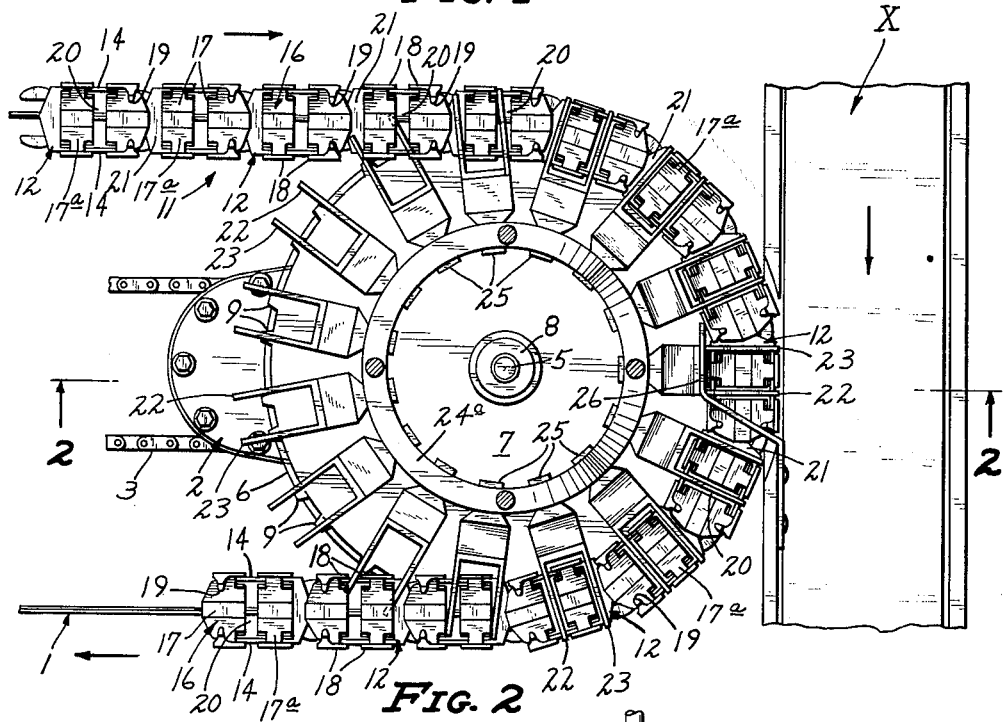
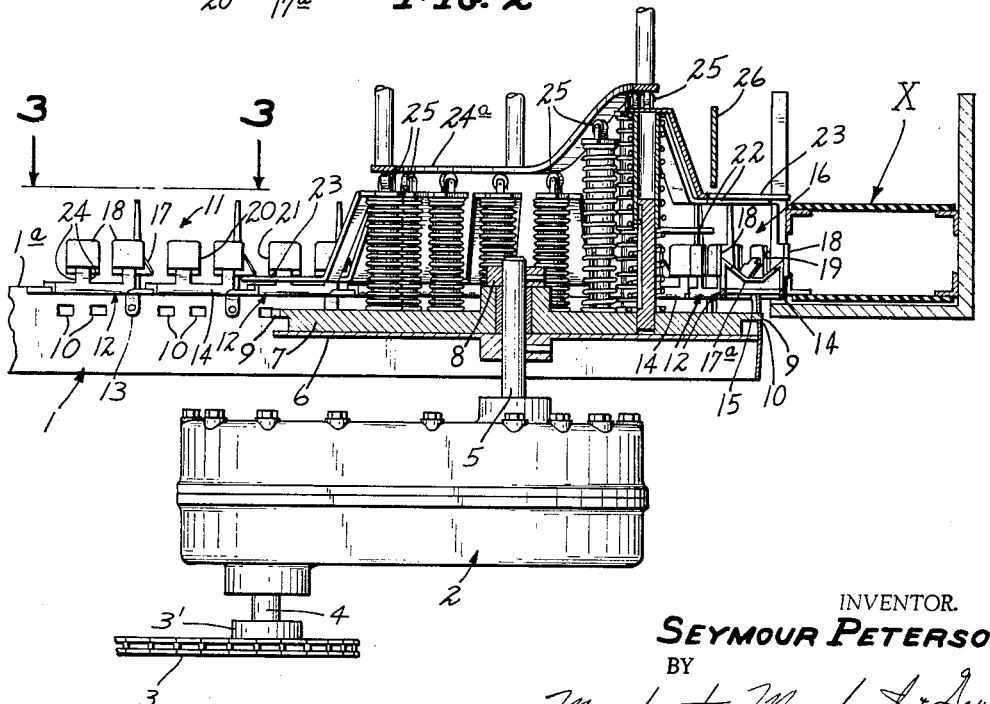
INVENTOR.
SEYMOUR PETERSON
ATTORNEYS

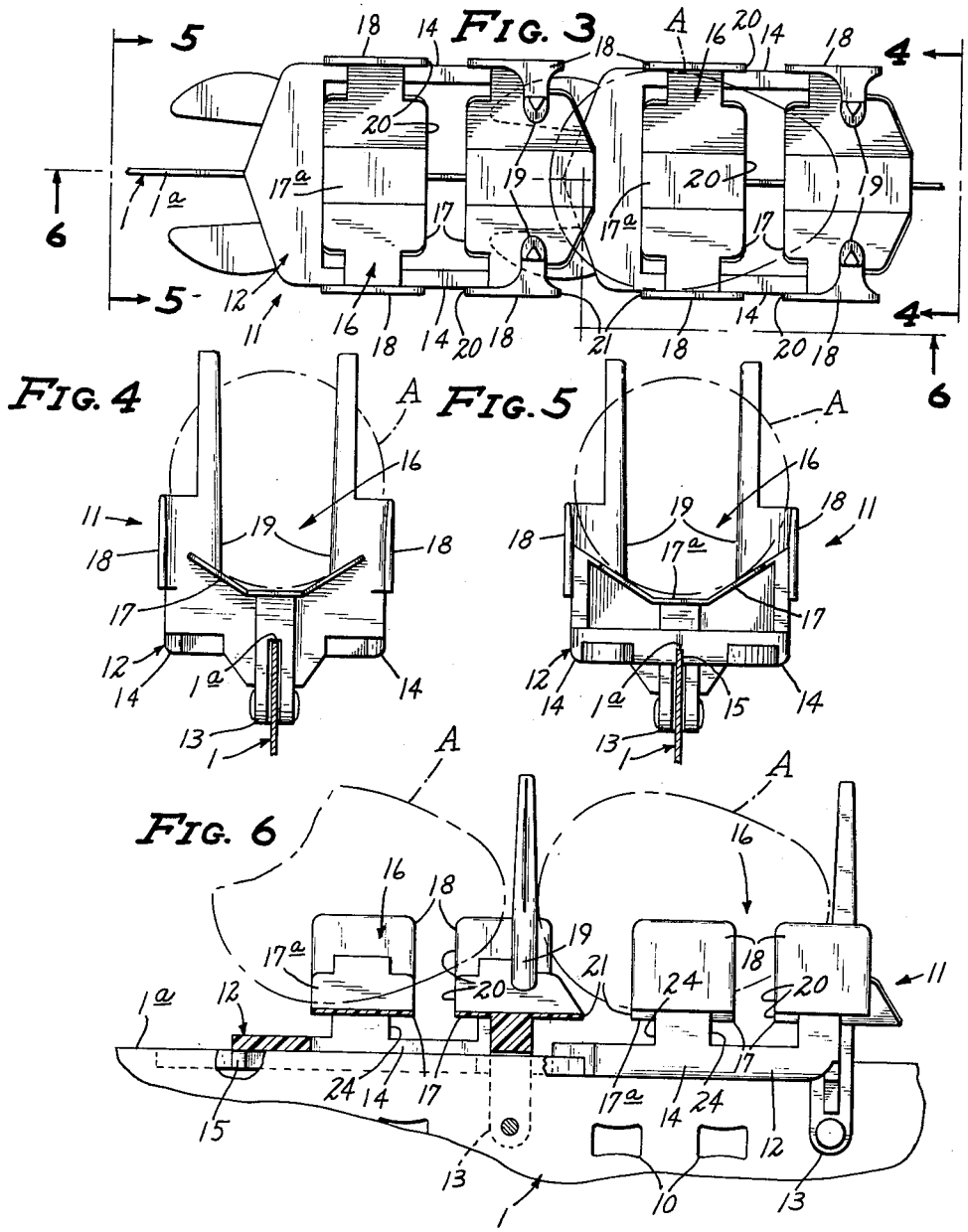

United States Patent Office 3,155,224
Patented Nov. 3, 1964

---

3,155,224
TRAY MEANS FOR EGG CONVEYORS
Seymour Peterson, Dassel, Minn., assignor to Storm Industries, Inc., Dassel, Minn., a corporation of Minnesota
Filed Sept. 17, 1963, Ser. No. 309,428
4 Claims. (Cl. 198—131)

My invention relates generally to automated egg collection systems, and more particularly to egg trays of the type which are adapted to be secured in end-to-end relationship along a conveyor belt.

Still more particularly, my invention relates to egg collection systems of the type which include endless conveyor belts leading from one or more spaced laying houses and which communicate with a cross conveyor and in combination with means for automatically transferring the eggs from the primary conveyor or conveyors to the cross conveyor.

The primary object of my invention is the provision of individual egg-receiving trays which are so formed that when mounted upon a conveyor belt in end-to-end relationship, one or more egg lifting fingers may be inserted transversely into and passed upwardly through the egg-cradling means defined thereby so as to effectively remove the egg therewith without interrupting the travel of said conveyor belt.

A further object of my invention is the provision of a device of the class immediately above described in which the trays are so formed as to impart a minimum of damage to the eggs received therein, carried thereby, or discharged therefrom.

A further object of my invention is the provision of egg trays of the class above described which have a cooperative relationship which, when placed end-to-end define continuous longitudinally spaced egg-receiving trays.

A further object of my invention is the provision of a device of the class above described which is so designed as to permit a pair of transversely extended laterally spaced lifting fingers to be inserted through the lower portions of the tray and passed upwardly through the cradle means defined thereby so as to effectively remove eggs therefrom with a minimum of damage.

The above and still further objects of my invention will become apparent from the following detailed specification, appended claims, and attached drawings.

Referring to the drawings wherein like characters indicate like parts throughout the several views:

FIG. 1 is a fragmentary view in top plan of an egg collection system incorporating my invention, some parts being broken away and some parts shown in section.

FIG. 2 is a sectional view taken generally on the line 2—2 of FIG. 1, portions thereof shown in elevation;

FIG. 3 is an enlarged view in top plan as seen from the line 3—3 of FIG. 2;

FIG. 4 is a view in front elevation as seen from the line 4—4 of FIG. 3, some parts shown in section;

FIG. 5 is a view in rear elevation as seen from the line 5—5 of FIG. 3, some parts shown in section; and FIG. 6 is a view in vertical longitudinal section as seen from the irregular line 6—6 of FIG. 3.

Referring with greater particularity to the drawings, the numeral 1 indicates an endless conveyor belt of the type disclosed in my copending application Serial No. 278,627, filed May 7, 1963, and is in the nature of a generally upright spring steel band. Band 1 which, at portions not shown is normally positioned below the delivery edge of the inclined floor of a laying house so as to collect eggs therefrom under the action of gravity, is powered by any suitable means such as shown in my above identified application, including a power transmitting device 2 associated with a link chain 3 which is entrained over a sprocket 3' fast on a power input shaft 4. Chain 3 in turn is associated with a power means such as an electrical motor, not shown. Fast on the power output shaft 5 of the power transmitting means 2 is a disc-like pulley 6 which engages the intermediate portion of the band 1 with sufficient force to impart a cross-sectional crown thereto, as shown in FIG. 2.

For a purpose which will hereinafter become apparent, an indexing sprocket 7 is journalled on the output shaft 5 in overlying relation to the disc-like pulley 6. A collar 8 limits upward movement of the sprocket 7 from the shaft 5. Sprocket 7 has teeth 9 which register with longitudinally spaced apertures 10 in the band 1 and index sprocket 7 and parts carried thereby with respect to the band 1.

Mounted in end-to-end relationship upon the upper edge 1a of the belt 1 in overlying relation to the indexing apertures 10 are my novel egg collection trays, shown in their entirety by the numeral 11. Trays 11 are preferably molded from flexible resilient plastic material such polyethylene to define an elongated frame-like base 12 and a depending bifurcated anchoring lug 13 at one end. As shown, the lug 13 is centrally positioned with respect to the opposite side portions 14 whereby to secure the trays on the belt 1 with the longitudinal axis thereof substantially in alignment with the path of travel of the belt 1. The other end of each of the trays 11 overlies and rests upon the upper edge 1a of the belt 1 and is precluded from lateral movements thereon by means of a downwardly opening notch 15 in which the upper edge 1a of the belt 1 is received.

Each of the trays 11, in overlying relation to the base 12 thereof, is formed to define an egg-receiving cradle indicated generally by 16 and including a floor element 17 and laterally spaced longitudinally extending barrier means 18.

As shown particularly in FIG. 3, the laterally spaced barrier means 18 of each tray 11 are adequately wide on each side of the floor elements 17a of floor 17 to receive the largest diameter eggs A of the type intended to be collected thereby, as indicated by broken lines in FIGS. 3–6, but are restricted at one end, preferably in overlying relationship to the anchoring lug 13, to define means in the nature of a restricted mouth 19 which limits movement of the eggs A in one direction. It will be noted that the several trays 11 are open at the end opposite the restricted mouth 19, but that adjacent trays are so mounted on the upper edge 1a of the belt 1 so that the restricted mouth 19 of each thereof limits movement of an egg A in the egg-receiving cradle 16 of an adjacent tray in the opposite direction.

Referring particularly to FIGS. 3–6, it will be noted that the floor 17 and each of the upstanding barrier means 18 is formed to define a notch 20 which opens upwardly through said floor 17 and upwardly and laterally outwardly with respect to said barrier means 18. This arrangement permits insertion from either side of the cradle 16 of a lifting finger therebelow and passage upwardly therethrough for the purpose removing an egg within the cradle 16. However, it will be noted that because of the spacing between the cradles 16 of the adjacent trays 11, a second notch 21 is defined between each of the restricted mouths 19. Thus, a pair of laterally spaced parallel lifting fingers 22–23 may be inserted below the cradles 16 of each tray 11 and passed upwardly therethrough for the purpose of securely removing eggs A from the cradles 16, incidental to placing same on a cross conveyor X, or the like. For the purpose of permitting oblique insertion and removal of such lifting fingers as those identified by 22, 23 in FIG. 1 into the notch 20, 21, below the floor means 17, it will be noted that the base portions 12 of each of the trays 11 is relieved as at 24. In the arrangement shown, a plurality of cooperating lifting fingers 22, 23 are mounted for common rotation with the sprocket 7. Due to the indexing of the sprocket 7 with respect to the belt 1, given sets of fingers 22, 23 are brought into alignment with the notches 20, 21 of each progressive tray element 11. Upwardly lifting movements are progressively imparted to the lifting fingers 22, 23 at a point adjacent the cross conveyor X by means of a cam ring 24a and spring biased cam followers 25. Eggs A at this point are moved laterally on to the conveyor belt by finger 26. Thereafter, fingers 22, 23 are again returned to their positions below the level of the floor 17 by the cam ring 24a and followers 25 immediately prior to their removal from said notches 20, 21.

My invention has been thoroughly tested and found to be entirely satisfactory for the accomplishment of the above objects; and while I have disclosed a preferred embodiment thereof, my invention may be capable of modification without departure from the scope and spirit of the appended claims.

What is claimed is:

1. Egg collection trays for use on a conveyor belt and adapted to be secured thereto in end-to-end relationship, each of said trays comprising:
    (a) a base having means associated therewith for securing same to a conveyor belt,
    (b) and a cradle above the level of and carried by said base,
    (c) said cradle comprising a floor and laterally spaced longitudinally extended barrier means,
    (d) said cradle being formed to define a notch which opens upwardly through said floor and upwardly and outwardly through one of said barrier means, whereby to permit insertion of a lifting finger laterally through said one of said barrier means and upwardly through said floor and said one of said barrier means.

2. The structure defined in claim 1 in which said notch extends into and also opens upwardly through the other of said barrier means.

3. The structure defined in claim 1 in which
    (a) the spacing between the cradles of adjacent trays defines a second notch for passage upwardly therebetween of a cooperating second transversely disposed lifting finger.

4. The structure defined in claim 1 in which the base portions of said trays are relieved adjacent said notches to permit oblique insertion and removal of lifting fingers transversely disposed with respect to the path of travel of said conveyor belt.

References Cited by the Examiner 3,042,134  7/62  Peterson _____ 198—131

SAMUEL COLEMAN, *Acting Primary Examiner.*

ERNEST A. FALLER, JR., *Examiner.*